United States Patent [19]

West

[11] Patent Number: 5,375,728
[45] Date of Patent: Dec. 27, 1994

[54] ASSEMBLY FOR COVERING A WALL-MOUNTED ELECTRICAL OUTLET

[76] Inventor: Frank L. West, 1211 Sailer Cir., Cape Girardeau, Mo. 63701

[21] Appl. No.: 79,892

[22] Filed: Jun. 21, 1993

[51] Int. Cl.$^5$ .............................. H02G 3/12
[52] U.S. Cl. ..................... 220/3.8; 439/148; 174/48; 174/67
[58] Field of Search ............ 220/3.8, 242; 174/67, 174/48; 439/148

[56] References Cited

U.S. PATENT DOCUMENTS

| | | | |
|---|---|---|---|
| 2,439,708 | 4/1948 | Abraham | 174/67 |
| 2,470,320 | 5/1949 | Page | 220/3.8 X |
| 2,510,745 | 6/1950 | Kilgore | 220/3.8 X |
| 2,942,226 | 6/1960 | Low | 174/67 X |
| 2,997,520 | 8/1961 | Kinsman | 220/3.8 X |
| 3,013,105 | 12/1961 | Craig | 220/3.8 X |
| 3,720,783 | 3/1973 | Moll | 220/3.7 X |
| 4,289,921 | 9/1981 | Gartner et al. | 174/48 |
| 4,451,101 | 5/1984 | Davis | 220/242 X |
| 4,496,067 | 1/1985 | Benscoter | 220/3.3 X |
| 4,970,349 | 11/1990 | Jones | 174/67 |
| 5,096,430 | 3/1992 | D'Amico | 174/67 |

OTHER PUBLICATIONS

Conventional electrical face plate described in present application, p. 1, lines 17–27.

*Primary Examiner*—Steven M. Pollard
*Attorney, Agent, or Firm*—Armstrong, Teasdale, Schlafly & Davis

[57] ABSTRACT

An assembly for covering the face plate and receptacle head of a wall-mounted electrical outlet has a cover plate with front and rear sides, and a plurality of prongs that extend from the rear of the cover plate to engage the receptacle. The cover plate is sized to cover the face plate of the receptacle and the receptacle when the prongs are so engaged. The plate has a rearwardly extending flange so that its rear surface fits flush against the wall when the prongs engage the receptacle. The flange has a frontwardly extending section that with the front side of the plate creates a front cavity. The cavity has a depth to receive a wall covering to allow a smooth plane to be created between the covering and the front surface of the front flange section. A modification comprises an assembly to cover an electrical outlet with a receptacle head, comprising a panel with a cover plate with front and rear sides, a base with a plate with a front and rear side with means for mounting to the electrical outlet, with the base having at least one opening shaped and positioned to fit around the receptacle head. This modification has means to secure the panel to the base to cover the receptacle head comprising a flange extending from the front of the base and a flange extending about the periphery of the panel. The panel flange has a section extending from the front side of the plate to create a cavity to receive a wall covering so that a smooth plane is created between the wall covering and the flange.

8 Claims, 2 Drawing Sheets

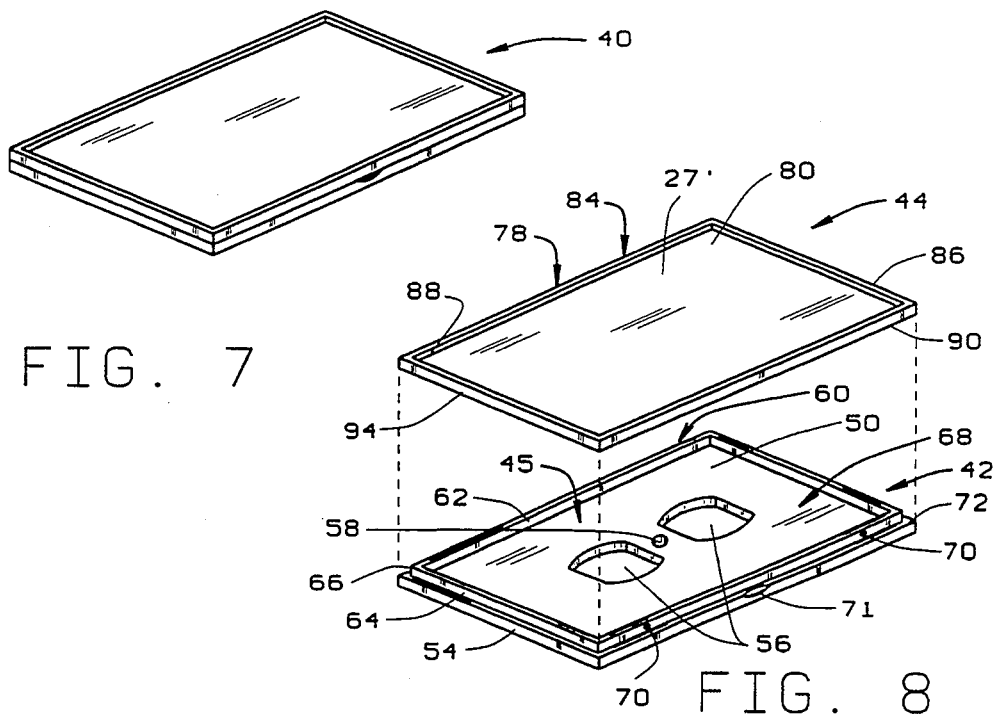
FIG. 7
FIG. 8
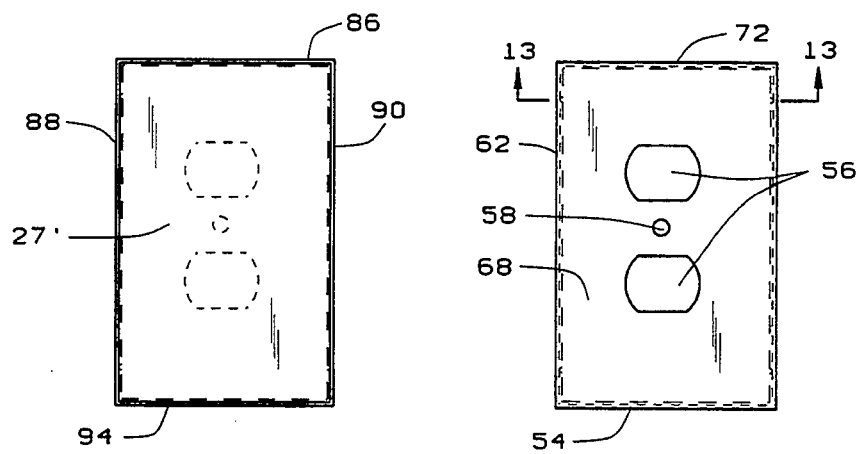
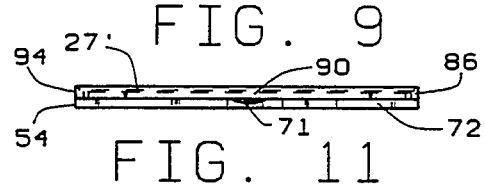
FIG. 9
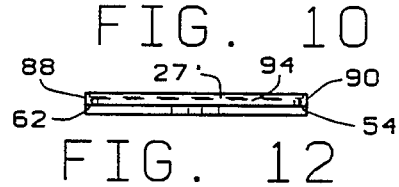
FIG. 10
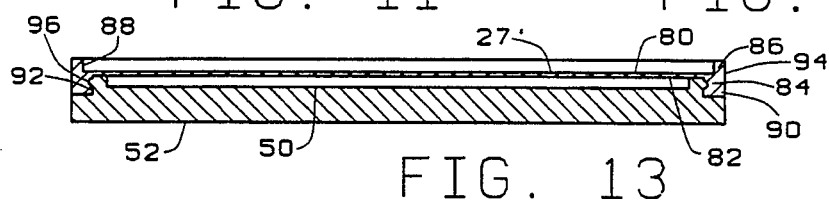
FIG. 11
FIG. 12
FIG. 13

ASSEMBLY FOR COVERING A WALL-MOUNTED ELECTRICAL OUTLET

FIELD OF THE INVENTION

This invention relates to an assembly for covering conventional wall-mounted electrical outlets and covering existing face plates for conventional wall-mounted electrical outlets.

BACKGROUND AND SUMMARY OF THE INVENTION

Modern homes and offices are riddled with electrical outlets. While variations of a standard electrical outlet are known in the art, the typical outlet comprises a hole in a wall providing access to a box. Electrical wiring terminates inside the box and is connected to an electrical receptacle. The receptacle is mounted to the box and contains a least one receptacle head for mating with a conventional electrical cord. The outlet is then covered with a face plate which leaves the receptacle head(s) exposed.

In their most common form, these face plates cover the hole in the wall, the box, and most of the receptacle, but leave the receptacle head(s) exposed. These outlets are necessary features in modern buildings and homes. However, the face plates are often glaring, unattractive, and quite conspicuous unless hidden by furniture or another object. Further, the exposed receptacle heads present a safety risk by allowing small children to insert conductive items into the receptacles, and possess poor insulating qualities in that drafts are able to flow through the receptacles into the building, especially when the outlet is on an outside wall.

The present invention overcomes the foregoing problems by providing a plate with receptacle-engaging prongs mounted to the rear side for securing the plate to a receptacle and thereby securing the plate to the corresponding electrical outlet. The plate, being wider and taller than a convention electrical face plate, covers the existing unsightly face plate and receptacle heads. The front side of the plate is able to be painted, wallpapered or otherwise decorated to blend with the decor of a particular room.

An alternative embodiment overcomes the foregoing problems by providing a base and a panel. The base, much like the prior art face plates, has means to be attached to the electrical outlet. The base covers the hole, the box and the receptacle while leaving the receptacle head(s) exposed. This embodiment further comprises a panel, which covers the base and the receptacle head(s), having means to be secured to the base. The front side of the plate is also able to be painted, wallpapered or otherwise decorated to blend with the room decor.

The characteristics of the present invention presents increased aesthetic appeal. Further, because the receptacles (and receptacle heads) are completely covered when not in use, it is more difficult for children to place conductive items into the receptacle heads, thereby making the present invention safer than the prior art devices. Likewise, by making conventional electrical outlets far less conspicuous than the prior art devices this invention is less likely to draw the attention of children, thereby reducing the risk that children will investigate the outlets or place conductive items into the receptacle heads. Moreover, covering the receptacles when not in use provides increased insulating qualities by reducing any draft that may flow through the receptacles into the building.

BRIEF DESCRIPTION OF THE DRAWINGS

In the accompanying drawings which form a part of the specification and are to be read in conjunction therewith, and in which like reference numerals are used to indicate like parts in the various views:

FIG. 7 is an isometric view of a second embodiment of an electrical outlet cover constructed according to the principles of this invention, showing the panel engaged with the base;

FIG. 8 is an isometric view of the electrical outlet cover showing the positional relationship between the panel and the base;

FIG. 9 is an elevation view of the panel viewed looking at the front side of the panel when the base is engaged with the panel;

FIG. 10 is an elevation view of the base viewed looking at the rear side of the base when the panel is engaged with the base;

FIG. 11 is a side elevation view illustrating the panel when engaged with the base;

FIG. 12 is a top plan view illustrating the panel when engaged with the base; and FIG. 13 is a section view taken along the line 13—13 of FIG. 10.

DETAILED DESCRIPTION OF THE PREFERRED EMBODIMENT

Figure 1:
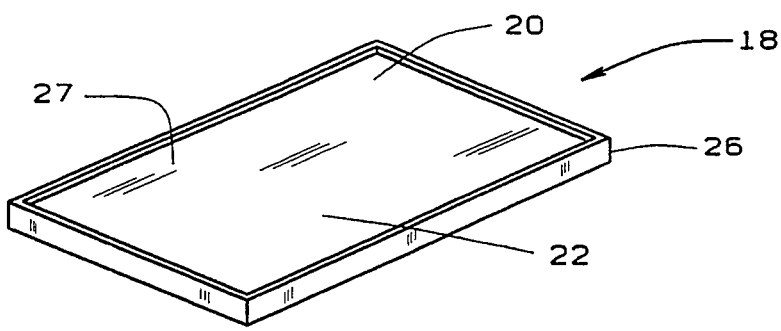
FIG. 1 is an isometric view of a first embodiment of an electrical outlet cover according to the principles of this invention showing the front side of the plate.

A first embodiment of the electrical outlet cover according to the principles of this invention is indicated generally as 18 in FIGS. 1-6. The outlet cover 18 comprises a plate 20, having a front side 22, a rear side 24, and a rectangular side flange 26. The side flange 26 is perpendicular to the plane of front side 22 and extends continuously around the periphery of the plate 20. A front cavity 27 is formed by side flange 26 and front surface 22 (see FIG. 1). Two pair of prongs 28 are mounted to, and extend perpendicularly from, the rear side 24. The prongs 28 are appropriately sized and spaced to engage conventional electrical receptacles in a conventional wall-mounted electrical outlet. The side flange 26 also extends perpendicularly from the plane of rear side 24 so that a rear cavity 32 is formed by side flange 26 and rear side 24 (see FIG. 2). The side flange 26 has a rear surface 34.

The dimensions of the outlet cover 18 are dictated by the size of commonly-used electrical outlet face plates: the measurements of which are approximately 2 ¾ inches wide by 4 ½ inches tall by ¼ inch deep. The dimensions of rear cavity 32 are therefore slightly larger than 2 ¾ inches by 4 ½ inches by ¼ inch. The depth of rear cavity 32 is such that the rear surface 34 of side flange 26 fits flush against the building wall when the prongs 28 engage the conventional electrical receptacles. The front side 22 is constructed of, or treated with, material conducive to accept paint, wallpaper or other wall coverings. The depth of front cavity 27 preferably provides a smooth plane between the side flange 26 and whatever wall covering is used to cover front side 22. If conventional wallpaper is placed on the front side 22, the depth of cavity 27 is approximately 1/16 of an inch. However, if the front side 22 is intended to be painted, the depth of cavity 27 is preferably less than 1/16 of an inch.

Figure 2:
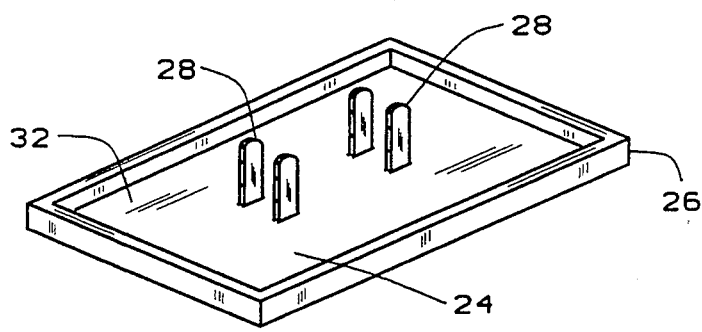
FIG. 2 is an isometric view of the electrical outlet cover showing the prongs and rear side of the plate.
Figure 3:
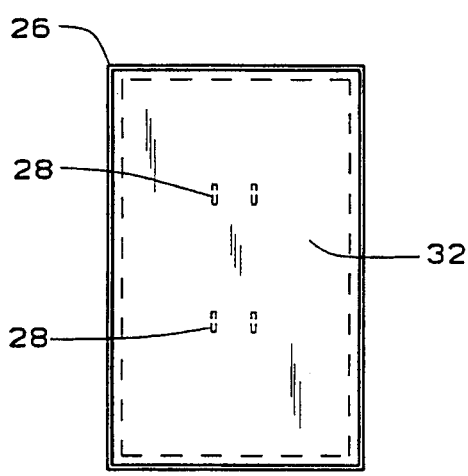
FIG. 3 is a front elevation view thereof.
Figure 4:
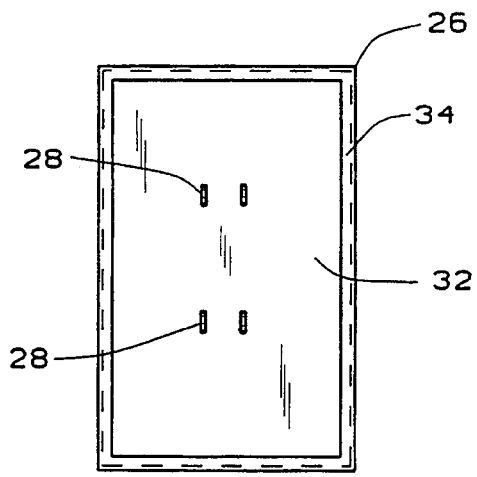
FIG. 4 is a rear elevation view thereof.
Figure 5:
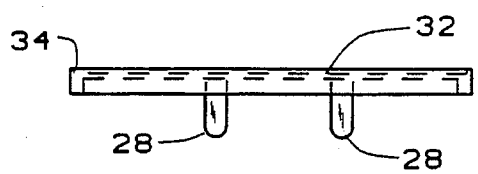
FIG. 5 is a side elevation view thereof.
Figure 6:
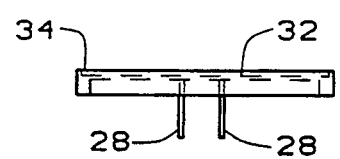
FIG. 6 is a top plan view thereof.

The width of the section of the flange 26 extending from the rear side 24 is thicker than the width of the section of the flange 26 extending from the front side 22 (see FIGS. 1, 2 and 3). Preferably the width of the front of flange 26 is approximately 1/16 inch and the width of the rear section of flange 26 is approximately ⅛ inch. The variation in edge widths provides added structural support for the rear side 24 of the plate 20 while maximizing the aesthetic value of the front side 22. The flange 26 and prongs 28 are preferably integrally molded with plate 20 so that the cover 18 is of integral and unitary structure.

A second embodiment of the electrical outlet cover constructed according to the principles of this invention is indicated generally as 40 in FIGS. 7-13. The cover 40 comprises a base 42 and a panel 44. The base 42 is generally rectangular and comprises a plate 45 that has a front side 50 and a rear side 52, a rearwardly extending rectangular flange 54 that extends around the entire periphery of the base 42, two receptacle head openings 56, and a hole 58 that extends through the plate 45. Base 42 further comprises a frontwardly extending raised flange 60 of rectangular shape having an inside surface 62, an outside surface 64 and a front surface 66. The flange inside surface 62 and the front side 50 of the base 42 define a base cavity 68. A plurality of convex snap pins 70 extend integrally from the flange outside surface 64, and a curved notch 71 is formed in the plate 45 at the central edge of its front side 50 and flange 54.

The outside surface 64 of raised flange 60 is generally rectangular and has a perimeter that is proportionally smaller than the perimeter of plate 45 so that the front side 50 extends beyond the entire periphery of the outside surface 64 of flange 60, to form an outer border 72 on front side 50.

The panel 44 comprises a plate 78 having a front side 80 and a rear side 82, and a flange 84 that extends integrally from plate 78 continuously around the periphery of panel 44. The flange 84 extends generally perpendicularly from both sides of plate 78 forming a raised front flange section 86 having an interior surface 88 and a raised rear flange section 90 having an interior surface 92. Flange sections 86 and 90 share a common outer surface 94. The interior surface 92 of raised rear flange section 90 contains a plurality of integral dimples 96, and the interior surface 88 of front flange section 86 and the front side 80 form a cavity 27'.

The outer surface 94 of flange 84 and the flange 54 of base 42 are both generally rectangular and have substantially the same dimensions. The interior surface 92 of panel rear flange section 90 has substantially the same dimensions (but slightly deeper, wider and taller) as those of the outside surface 64 of raised flange 60 on base 42 so that panel flange 60 fits snugly within base flange section 90, and accordingly panel 44 is attached to base 42. The dimples 96 of panel 44 are appropriately sized and positioned to accept the convex snap pins 70 of base 42 to hold the panel 44 to base 42. The outside surface 64 of raised flange 60 is substantially the same height as the interior surface 92 of raised rear flange section 90 so that the outer surface 94 of flange sections 86 and 90 fits smoothly and level with the outer surface of flange 54 of base 42 when the panel and base are fastened together. (See FIG. 7.)

Similar to the first preferred embodiment described above, front side 80 of panel 44 is constructed of, or treated with, material conducive to accept paint, wallpaper, or other wall covering. The depth of the front cavity 27' preferably provides a smooth plane between the front flange section 86 and whatever wall covering is used to cover front side 80. If conventional wallpaper is placed on the front side 80, the depth of cavity 27' is approximately 1/16 of an inch. However, if the front side 80 is intended to be painted, the depth of cavity 27' is preferably less than 1/16 of an inch. The components of base 42 are preferably integrally molded with the plate 45 so that the base 42 is of integral and unitary structure. Likewise, the components of panel 44 are preferably integrally molded with the plate 78 so that the panel 44 is of integral and unitary structure.

OPERATION

In operation of the cover 18 of the first embodiment, the front side 22 of plate 20 is painted, wallpapered, or otherwise decorated to closely match the color and pattern of the wall in which the electrical outlet is placed. When the electrical outlet is not in use, the prongs 28 of plate 20 are inserted into the receptacles such that the rear surface 34 of side flange 26 fits flush against the wall surrounding the electrical outlet. The plate 20 hides the existing electrical outlet face plate and receptacle heads, providing an aesthetically pleasing appearance. For further aesthetic appeal, the side flange 26 can be similarly painted or decorated. The plate 20 is easily and conveniently removed anytime the electrical outlet is needed.

The description of operation of the cover 40 of the second embodiment begins with an uncovered electrical outlet. Therefore, if an electrical outlet face plate is presently in place, the existing face plate must first be removed. The typical outlet comprises a hole in a wall providing access to a box. Electrical wiring terminates inside the box and is connected to an electrical receptacle. The receptacle is mounted to the box and contains at least one receptacle head for mating with a conventional electrical cord. Conventional electrical receptacles contain a threaded hole to accept a screw for securing the prior art face plates to the receptacles. The base 42 is placed over the hole in the wall and the electrical box such that the receptacle head openings 56 fit snugly around the receptacle heads while the base 42 covers the wall hole, the electrical box and the receptacle. The hole 58 of base 42 aligns with the threaded hole found in conventional receptacles and a screw is inserted through hole 58 and threaded into the electrical outlet thereby securing base 42 to the electrical outlet.

The cavity 27' of panel 44 is painted, wallpapered or otherwise decorated to match the color and pattern of the wall surrounding the electrical outlet. When the outlet is not in use, the panel 44 is placed over the base 42 such that the interior surface 92 of flange section 90 fits snugly with the outside surface 64 of raised flange 60 on base 42. The width of the flange section 90 is substantially the same width as the border 72 so that the periphery of outer surface 94 of the panel 44 smoothly meets the outer surface of flange 54 of base 42 forming an aesthetically pleasing cover for the receptacle heads and base 42.

When the panel is properly placed over the base, the dimples 96 are aligned with and accept the snap pins 70 thereby securing the panel to the base. When the electrical outlet is needed, the receptacle heads are easily exposed by grasping the outer surface 94 of the panel and removing the panel from the base. The fluted groove(s) 71 of the base allow for a better grip on the panel 44 for easier removal.

The foregoing demonstrates that this invention achieves the objects set forth herein and offers other advantages apparent from the foregoing discussion. Although the present invention is illustrated herein with reference to the accompanying drawings and described embodiments, it is to be understood that the invention is not limited to those embodiments and that various changes and modifications may be effected therein by one skilled in the art without departing from the scope or spirit of the invention.

I claim:

1. An assembly for covering the face plate and receptacle head of a wall-mounted electrical outlet, comprising:

a cover plate having a front side and a rear side;

a plurality of prongs, mounted to and extending perpendicularly from the rear side of the cover plate sized and spaced to engage the receptacle of the electrical outlet;

the cover plate being sized to cover the face plate of the receptacle and cover the receptacle when the prongs engage the receptacle of the electrical outlet; and a flange extending perpendicular with respect to the rear side of the plate around the periphery of the plate, the flange having a rear surface and being shaped so that the rear surface of the flange can fit flush against the wall when the prongs engage the receptacle of the electrical outlet, the flange also having a frontwardly extending section that extends perpendicular with respect to the front side of the plate and having a front surface, the frontward flange section and the front side of the plate creating a front cavity with the frontwardly flange section having a depth so that when a wall covering is applied within the cavity, a smooth plane is created between the wall covering and the front surface of the frontward flange section.

2. The assembly according to claim 1 wherein the front cavity is approximately 4 9/16 inches by 2 13/16 inches by 1/16 inch deep.

3. The assembly according to claim 1 wherein the flange extends continuously around the periphery of the plate.

4. The assembly according to claim 1 wherein the flange and prongs are integrally molded with the plate forming a unitary structure.

5. An assembly for covering a wall-mounted electrical outlet having at least one receptacle head, comprising:

a panel, comprising a cover plate having a front side and rear side, a base having a plate with a front side and a rear side, the base having means for being mounted to the electrical outlet and having at least one opening shaped and positioned to fit around the electrical outlet receptacle head;

means for securing the panel to the base so that the panel covers the electrical outlet receptacle head, comprising a flange extending from the front side of the base, and a flange extending around the periphery of the panel from the rear side of the cover plate, one of the surfaces of either the base flange or panel flange having a plurality of projecting snap pins, and a facing surface of the other of the base flange or panel flange having a plurality of dimples sized and positioned to accept the snap pins of the other flange to allow the cover plate to be secured to the base, with the distance of the extension of the flange having the dimples being slightly longer than the flange having the snap pins; and the flange of the panel having a section that extends perpendicularly with respect to the front side of the plate creating a cavity of appropriate depth such that when a wall covering is applied to the front side of the panel, a smooth plane is created between the wall covering and the flange.

6. The assembly according to claim 5 wherein the base flange has the projecting snap pins and the cover flange has the dimples to receive the snap pins, and the base plate or the cover plate has a notch to facilitate removal of the panel from the base.

7. The assembly according to claim 5 wherein cavity depth is approximately 1/16 of an inch.

8. An assembly for covering the face plate and receptacle head of a conventional wall-mounted electrical outlet, comprising:

a cover plate having a front side and a rear side;

a plurality of prongs, mounted to and extending perpendicularly from the rear side of the cover plate sized and spaced to engage the receptacle of the electrical outlet;

the cover plate being sized to cover the face plate and the receptacle when the prongs engage the receptacle of the electrical outlet;

a flange extending rearwardly from around the periphery of the cover plate, the flange having a rear surface and being shaped so that the rear surface of the flange can fit flush against the wall when the prongs engage the receptacle of the electrical outlet; the flange also having a frontwardly extending section that extends perpendicular with respect to the front side of the cover plate and having a front surface, the frontward flange section and the front side of the cover plate creating a front cavity with the frontwardly flange section having a depth so that when a wall covering is applied within the cavity, a smooth plane is created between the wall covering and the front surface of the frontward flange section.

* * * * *